US008638789B1

(12) United States Patent
Pani (10) Patent No.: US 8,638,789 B1
(45) Date of Patent: Jan. 28, 2014

(54) OPTIMAL MULTICAST FORWARDING IN OPENFLOW BASED NETWORKS

(75) Inventor: Ayaskant Pani, Fremont, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/464,305

(22) Filed: May 4, 2012

(51) Int. Cl.
*H04L 12/28* (2006.01)
*H04L 12/56* (2011.01)

(52) U.S. Cl.
CPC ...................................... *H04L 45/16* (2013.01)
USPC ........................................... 370/390; 370/401

(58) Field of Classification Search
USPC ............................ 370/241–252, 312, 390, 401
See application file for complete search history.

(56) References Cited

U.S. PATENT DOCUMENTS

| 6,785,275 | B1 * | 8/2004 | Boivie et al. .................. 370/390 |
| 7,281,058 | B1 * | 10/2007 | Shepherd et al. ............. 709/238 |
| 7,769,008 | B2 * | 8/2010 | Sakamoto et al. ............ 370/390 |
| 2002/0191631 | A1 * | 12/2002 | Couty ............................ 370/432 |
| 2003/0223372 | A1 * | 12/2003 | Sanchez et al. ............... 370/237 |
| 2007/0030855 | A1 * | 2/2007 | Ribiere et al. ................ 370/401 |
| 2010/0088416 | A1 * | 4/2010 | Kurita ........................... 709/227 |
| 2012/0230332 | A1 * | 9/2012 | Fernandez Gutierrez .... 370/390 |

* cited by examiner

*Primary Examiner* — Kan Yuen
(74) *Attorney, Agent, or Firm* — Nelson Mullins Riley & Scarborough LLP (57) ABSTRACT

An OpenFlow controller is provided to control network devices provided in a network to transmit a multicast data packet. The OpenFlow controller may intercept and examine an IGMP report packet send by one or more hosts to determine the hosts that are interested in receiving data sent by the host. The OpenFlow controller may send the IGMP report packet directly to a multicast-enabled WAN-edge router. Other network devices such as switches, access routers and intermediary routers that may be present in the network architecture do not perform any multicast control plane activity and hence, do not have to be multicast-enabled. According to various embodiments, the WAN-edge router is the only multicast enabled element of the network. The remaining elements are not required to be multicast-enabled because their responsibilities are performed by the OpenFlow controller.

7 Claims, 8 Drawing Sheets

OPTIMAL MULTICAST FORWARDING IN OPENFLOW BASED NETWORKS

BACKGROUND

Conventional data transactions between a source and a host, i.e. a recipient, may be a unicast transmission where the source sends a data packet to each host or a multicast transmission where the source sends a single data packet or stream of information to a group of hosts. The group of hosts is a multicast group formed of arbitrary recipients that express an interest in receiving the data transmitted by the source. In the multicast transmission, the data packet may be replicated using network devices so that each host in the group gets a copy of the transmission. Accordingly, communication traffic may be reduced using the multicast transmission technology. Exemplary multicast transmissions may include webinars, video/audio conferences, internet radio, internet television, networked games, etc.

In conventional multicast transmissions, the hosts indicate their interest in the data transmitted by the source by sending an Internet Group Management Protocol (IGMP) report to one or more multicast-enabled routers in the network. The routers create a multicast distribution tree via Protocol Independent Multicast (PIM) for delivering the data from the source to the hosts.

The network supporting the multicast traffic may include one or more network devices, such as layer-2 switches. The hosts and routers are exchanging data packets. In a conventional IP multicast, the layer-2 switches optimize multicast data forwarding through a mechanism called IGMP snooping. The layer-2 switches look into, i.e. snoop, the IGMP report to determine the hosts that are interested in the data packet. The layer-2 switches determine the ports that the interested hosts are connected to and forward the multicast traffic to the determined ports.

SUMMARY

The traditional way of implementing multicast needs each network element within the enterprise network to support multicast. Accordingly, conventional multicast networks require multiple network devices, such as the routers and the layer-2 switches, to be multicast-enabled. For example in order for multicast data packet to reach end hosts from the multicast wan router, the intermediate router must also understand and participate in multicast protocols. Similarly to optimize flooding of multicast within the Layer-2 network the switches must perform IGMP snooping. However these are rather complex to configure and manage. Thus, the current network support of multicast traffic is complex and cumbersome to deploy. The present application addresses these and other issues.

In exemplary embodiments, an OpenFlow controller optimizes multicast traffic flows and reduces configuration complexity. Accordingly, the access and intermediate routes of the network do not participate in any multicast protocol handling. Hence, the access and intermediate routes do not have to be multicast enabled. Similarly the IGMP snoop functionality and optimized forwarding functionality of layer-2 switches are not needed. The OpenFlow controller may have knowledge of the topology and the current state of the network. Accordingly, the OpenFlow controller may be aware of active and inactive links within the network. Based on the information the OpenFlow controller can program the various network devices to properly forward various types of multicast packets (such as IGMP query packet, IGMP report packet, multicast data packet, etc). The structure discussed herein removes complexity from the network software and simplifies management and configuration of the network.

Described herein are systems, mediums, and methods for transmitting multicast data packet from the source to a plurality of hosts using an OpenFlow controller associated with the network.

According to various embodiments, a non-transitory electronic device readable storage medium is provided. The medium holds instructions that, when executed, cause one or more processors to intercept a unit of communication sent from a host to a network access device in a network. The unit of communication expresses interest in a multicast data packet destined for a multicast group address. The medium further holds instructions that, when executed, cause one or more processors to analyze the unit of communication to determine one or more hosts interested in receiving the multicast data packet. The medium also holds instructions that, when executed, cause one or more processors to determine the one or more hosts interested in receiving the multicast data packet and identify a multicast-enabled router in communication with the source. The medium also holds instructions that, when executed, cause one or more processors to send the unit of communication to the multicast-enabled router.

According to various embodiments, a non-transitory electronic device readable storage medium is provided. The medium holds instructions that, when executed, cause one or more processors to determine one or more hosts interested in receiving a multicast data packet destined for a multicast group address. The medium further holds instructions that, when executed, cause one or more processors to configure one or more network devices provided in a local area network for transmitting the multicast data packet to the one or more determined hosts. The multicast data packet sent is transmitted to the one or more determined hosts based on configuration of the one or more network devices.

Various embodiments include a non-transitory electronic device readable storage medium. The medium holds instructions that, when executed, cause one or more processors to configure one or more non-multicast-enabled network devices provided in a local area network for transmitting a multicast data packet received from a source to two or more hosts provided in two or more local area networks. The medium further holds instructions to transmit a single copy of the multicast data packet from the source to a network access device in communication with the two or more local area networks. The multicast data packet is replicated within the local area network for each host in the local area network.

According to various embodiments, a non-transitory electronic device readable storage medium is provided. The medium holds instructions that, when executed, cause one or more processors to receive a communication packet from one of a plurality of hosts in a local area network. The medium further holds instructions that, when executed, cause one or more processors to send the received communication packet to a multicast-enabled router and receive a reply from the multicast-enabled router in response to the communication packet. The medium also holds instructions that, when executed, cause one or more processors to configure one or more network devices of the local area network based on the reply sent from the multicast-enabled router.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Described herein are systems, mediums, and methods for controlling dataflow in a multicast transmission using an OpenFlow controller. The OpenFlow controller is provided on a remote server and controls network devices, such as switches and/or routers provided in the network. The OpenFlow controller performs control plane activities on behalf of the network devices controlled by the OpenFlow controller. In multicast implementations, one or more hosts send Internet Group Management Protocol (IGMP) report packets to express interest in receiving multicast data packet destined to a multicast group address. The OpenFlow controller may configure one or more access switches connected to the one or more hosts to forward any IGMP report packet directly to the OpenFlow controller instead of forwarding the IGMP report packet to the network. According to various embodiments, the OpenFlow controller may receive the IGMP report packet send by one or more hosts and forwarded by one or more access switches. The OpenFlow controller examines or analyzes the packet to determine the hosts that are interested in receiving multicast data packet. Upon determining the interested hosts, the OpenFlow controller may send the IGMP report packet directly to the multicast enabled wide area network (WAN) edge router, by-passing any other network devices such as switches, access routers and intermediary routers that may be present in the network architecture. The WAN-edge router routes the multicast data packets between the WAN that may include the one or more hosts and the enterprise network that may include the source. According to various embodiments, the source of the multicast data packet can be outside the enterprise, e.g. in the WAN. If the source of the multicast data packet is in the WAN, the multicast data packets may be transmitted to the determined interested hosts based on the flows installed on the network devices controlled by the OpenFlow controller. In some embodiments, the WAN-edge router may be the only multicast enabled element of the network. The remaining elements are not required to be multicast-enabled because their responsibilities are performed by the OpenFlow controller.

The OpenFlow controller discussed herein may program the flows at various network devices. The flows may represent the rules for forwarding the multicast data packets sent from one or more sources. A matching rule in a flow may include, for example, matching the destination address of the multicast data packet to a particular multicast group address. Such an exemplary flow may implement (*,G) multicast forwarding. In some embodiments, the matching rule may also include matching the source of the multicast data packet to a particular host address and the destination address to be a particular multicast group address. Such an exemplary flow may implement (S,G) multicast forwarding. The OpenFlow controller may formulate the flow rules and program the flows, e.g. install flow rules, on the network devices. According to various embodiments, the OpenFlow controller may determine the one or more end hosts interested in participating a multicast group and may program flows in one or more intermediate routers such that the multicast data packet is routed by the one or more intermediate routers to the determined one or more end hosts.

The OpenFlow controller discussed herein runs on a remote server. Accordingly, the OpenFlow controller is independent of the network controlled by the OpenFlow controller. In addition, the OpenFlow controller removes the control plane responsibility from the intermediate routers, access routers or switches. The OpenFlow controller may program flows in the network devices controlled by the OpenFlow controller. The flows may define a criteria that determines the output ports of the network devices where the incoming packets may be sent out. Thus, the flows may allow the network devices to efficiently forward data-plane packets. Accordingly, the software for implementing the intermediate routers, access routers and switches may be less complicated, and thus cheaper, than the software for implementing conventional intermediate routers, access routers and switches.

Moreover, the OpenFlow controller may configure one or more elements of the network based on the information gleaned from IGMP packets. For example, the OpenFlow controller may configure flows on the switches such that the data sent by the source is output only at ports to which interested hosts are connected. According to exemplary embodiments, each network device may be connected to and controlled by the OpenFlow controller. Any communication and/or request destined to a multicast address within the OpenFlow network may be directed to the WAN-edge router. Similarly, any multicast data sent from a source in the WAN may be distributed inside the enterprise network to the interested hosts via the flows programmed on the various access and/or intermediate routers by the OpenFlow controller.

The OpenFlow controller described herein may optimize the communication both in layer-2 multicast traffic, i.e. data transfer between the network devices at the data link layer, and layer-3 multicast traffic, i.e. data transfer from the source to the one or more hosts at the network layer.

In some embodiments, the OpenFlow controller may optimize the number of copies of the data packet destined to a multicast group address that travel within the physical local network. Conventionally, when the interested hosts are provided on different virtual local area networks (VLAN), the layer-2 switch connected to the VLANs receives multiple copies of the data packet from the edge router. The layer-2 switch then forwards the copies to each member port of a given VLAN. The conventional communication results in suboptimal use of network resources. According to various embodiments discussed herein, the OpenFlow controller may configure the intermediate routers such that only one multicast data packet is forwarded to the layer-2 switch irrespective of the number of different VLANs that have hosts interested in the data packet. The OpenFlow controller may configure the routers and switches such that only the host facing the layer-2 switch replicates the data packet based on the number of VLANs and the member ports within the VLANs.

Figure 1:
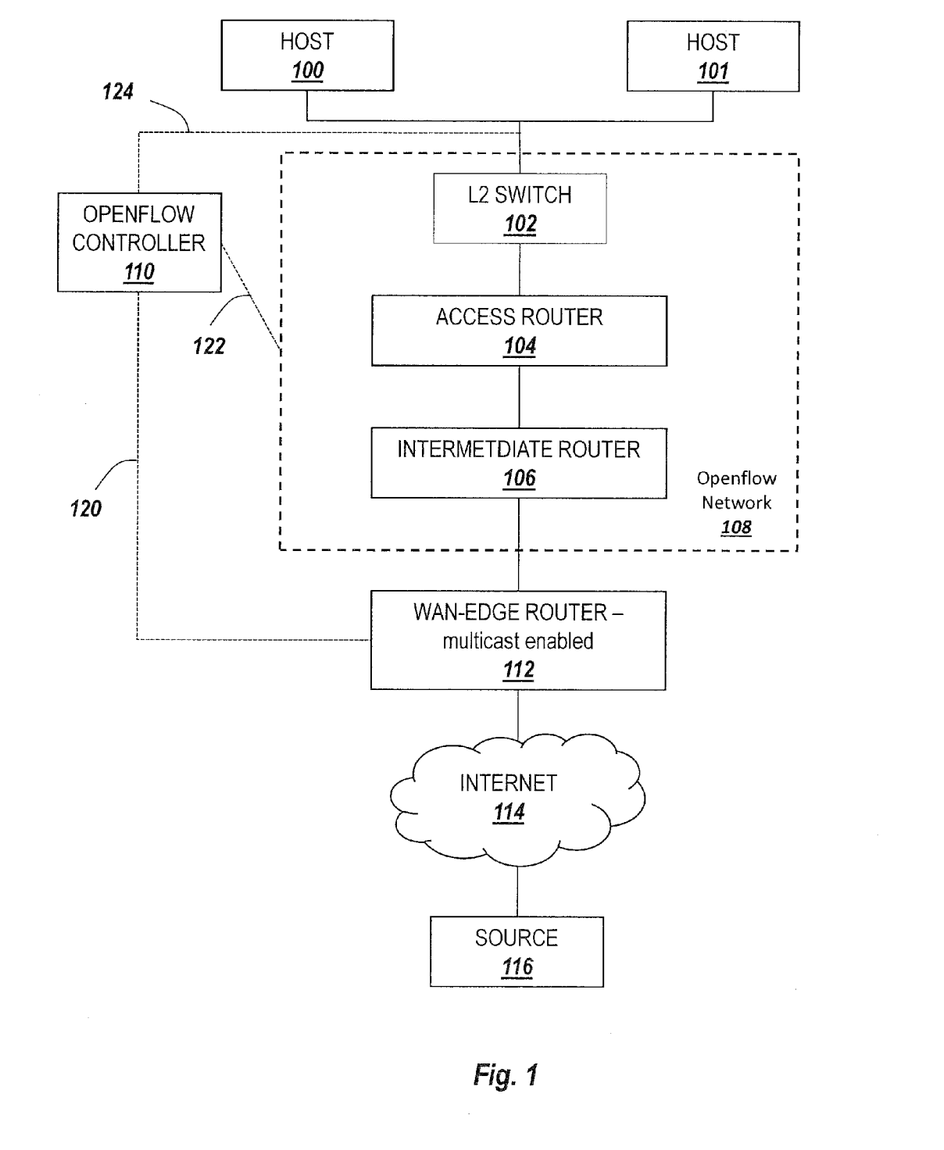
FIG. 1 depicts an exemplary network where an OpenFlow controller controls at least a portion of a multicast transmission according to exemplary embodiments described herein.

FIG. 1 illustrates an exemplary network where one or more network devices are controlled by a OpenFlow controller 110. The OpenFlow controller 110 may be provided on a remote server that may be connected to the network devices via a separate control plane network. According to various embodiments, the OpenFlow controller 110 may be linked to one or more network devices via one or more logical links, as illustrated via dashed lines 120, 122 and 124. The network illustrated in FIG. 1 may include a source 116 that may send multicast data packets. One or more hosts 100, 101 may express interest in receiving the multicast data packets destined to a multicast group address. The hosts 100, 101 may express interest in the multicast data packet by sending an IGMP report packet to the network device, such as layer-2 switch 102, connected to the hosts 100, 101.

The OpenFlow controller 110 may receive the IGMP report packet from the layer-2 switch 102. For example, the OpenFlow controller 110 may intercept the IGMP report packet by installing punt flow in the network switch where the hosts 100, 101 are connected. The punt flow causes the layer-2 switch 102 to automatically send the IGMP report packet sent from the hosts 100, 101 to the OpenFlow controller 110. The OpenFlow controller 110 may examine the IGMP report packet to determine which hosts are interested in receiving the multicast data packet. That is, the OpenFlow controller 110 may perform IGMP snooping to determine where to deliver the multicast data packet sent for a given destination multicast group address. According to various embodiments, there may be a plurality of multicast data packets in the network. In such embodiments, the OpenFlow controller 110 may determine which hosts are interested in receiving which multicast data packets. The OpenFlow controller 110 may forward the IGMP report packet directly to the WAN-edge router 112, by-passing the intermediate network devices including, for example, the layer-2 switch 102, the access router 104 and the intermediate router 106 that are in the OpenFlow network 108. In some embodiments, the OpenFlow controller 110 may discover the WAN-edge router 112 in the network. Alternatively, the location of the WAN-edge router 112 may already be configured in the OpenFlow controller 110. The communication between the OpenFlow controller 110 and the WAN-edge router 112 is discussed below in greater detail.

Upon determining the interested hosts 100, 101, the OpenFlow controller 110 may install the appropriate data flows in the network devices. The data flows may have the destination address field set to the multicast group address and the output ports may be set to various ports on the layer-2 switch 102 to which the hosts 100, 101 are connected. Multicast data may be transmitted to the hosts 100, 101 via the internet 114 when all network devices are properly configured by the OpenFlow controller 110.

In the network illustrated in FIG. 1, only the WAN-edge router 112 is required to be multicast-enabled. As the layer-2 switch 102, the access router 104 and the intermediate router 106, do not perform any multicast control plane activity, these network devices are not required to be multicast-enabled. Accordingly, the multicast traffic may be more robust by taking the control power out of the layer-2 switch 102, the access router 104 and the intermediate router 106 and giving the control power to the OpenFlow controller 110. The layer-2 switch 102, the access router 104 and the intermediate router 106 may be implemented using simpler, less complicated software compared to the conventional networks supporting multicast traffic.

The location of the WAN-edge router 112 may be configured in the OpenFlow controller 110. According to various embodiments, the OpenFlow controller 110 may also discover the WAN-edge router 112 in the network by using IGMP multicast router discovery protocol.

Alternatively, the OpenFlow controller 110 may discover the WAN-edge router 112 by listening for IGMP query messages sent by the WAN-edge router 112 to refresh the multicast group membership information. The IGMP query messages are intended for the one or more hosts 100, 101 so that the hosts 100, 101 can subscribe to the multicast group. The hosts 100, 101 send the IGMP report packet in response to the IGMP query message sent from the WAN-edge router 112 to join the multicast group for receiving the multicast data. When the multicast enabled WAN-edge router 112 sends the IGMP query packet, the OpenFlow controller 110 may ensure that the packet is flooded within the network by installing flood flows in the layer-2 switch 102 and the intermediate routers. The OpenFlow controller 110 may also send a message to the layer-2 switch 102 for directing the layer-2 switch 102 to flood the packet on all the ports expect for the incoming port and any blocked ports that may exist. The OpenFlow controller 110 may optimize the flooding of the IGMP query packet by restricting the packet to be forwarded out of ports which lead to a host 100 or 101.

When the OpenFlow controller 110 located the WAN-edge router 112 in the network, the OpenFlow controller 110 communicates with the WAN-edge router 112. In some embodiments, the OpenFlow controller 110 may be directly connected to the WAN-edge router 112. According to various embodiments, the OpenFlow controller 110 may send a message, for example a packet-out message, open-flow message which embeds the IGMP report packet, to the one or more intermediate routers in the network. For example, the OpenFlow controller 110 may send a packet-out message embedding the IGMP report packet to the access router 104 or the intermediate router 106. The packet-out message may direct the access router 104 or the intermediate router 106 receiving the message to send the incoming IGMP report packet embedded within the packet-out message on a port connected to the WAN-edge router 112. As a result, the WAN-edge router 112 may receive the IGMP report packet from the OpenFlow controller 110.

The OpenFlow controller 110 discussed herein may be aware of the network topology using the information gathered from the network devices controlled by the OpenFlow controller 110. Using the IGMP analysis, the OpenFlow controller 110 may determine the hosts that are interested in receiving the multicast data packet sent from one or more sources. Using the gathered information, the OpenFlow controller 110 may formulate the flow rules and configure the one or more network devices using the flow rules. In some embodiments, the OpenFlow controller 110 may generate a graph representing the network topology. For example, the OpenFlow controller 110 may generate a Steiner tree including the determined hosts interested in receiving the multicast data packet. Based on the graph, the OpenFlow controller 110 may install flows in the intermediate network devices, such as the access router 104 and the intermediate router 106. The multicast data packet may be routed by the intermediate network devices to the determined hosts based on the installed flows.

Figure 2:
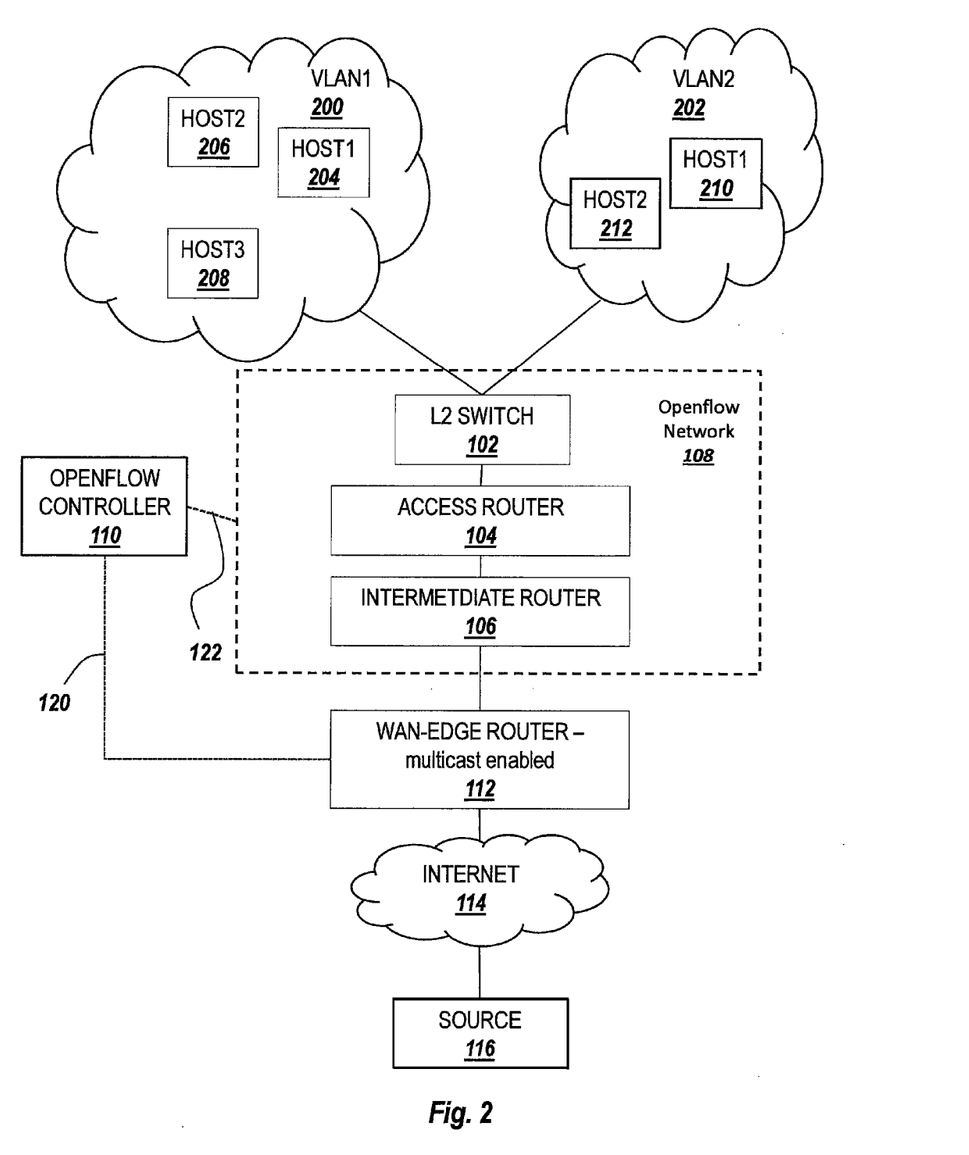
FIG. 2 depicts an exemplary network with multiple hosts in different virtual local area networks (VLAN) where an OpenFlow controller controls at least a portion of a multicast transmission according to exemplary embodiments described herein.

According to various embodiments, the hosts may be provided in separate VLANs. FIG. 2 illustrates an exemplary network 200 where hosts 202, 204, 206 are provided in a first VLAN 200 and hosts 210, 212 are provided in a second VLAN 202 different from the first VLAN 200. Conventionally, a multicast data packet is forwarded to the multiple VLANs if there are hosts in the VLAN that are interested in the multicast data packet. The layer-2 switch connected to the hosts of different VLANs receives multiple multicast data packets from the WAN-edge router. For example, in the network illustrated in FIG. 2, conventionally, layer-2 switch 102 would receive two multicast data packets from the WAN-edge router 112. Layer-2 switch 102 forwards each multicast data packet to the VLANs 200, 202, where the packet is further multiplied according to the number of hosts in each VLAN that are interested in the multicast data packet.

Using the OpenFlow controller 110 described herein, it is possible to reduce the number of multicast data packets that travel in the network. For example, the OpenFlow controller 110 may program flows in the WAN-edge router 112, the intermediate router 106 and the access router 104 such that only one copy of the multicast data packet is forwarded to the layer-2 switch 102. Accordingly, layer-2 switch 102 receives a single copy of the multicast data packet irrespective of the number of VLANs 200, 202 attached to the layer-2 switch 102. The multicast data packet is replicated within each VLAN 200, 202 as required by the number of hosts interested in receiving the multicast data packet.

FIGS. 3-6 are flowcharts of actions that may be performed by the OpenFlow controller according to exemplary embodiments described herein. The flowcharts are discussed in further detail below.

Figure 3:
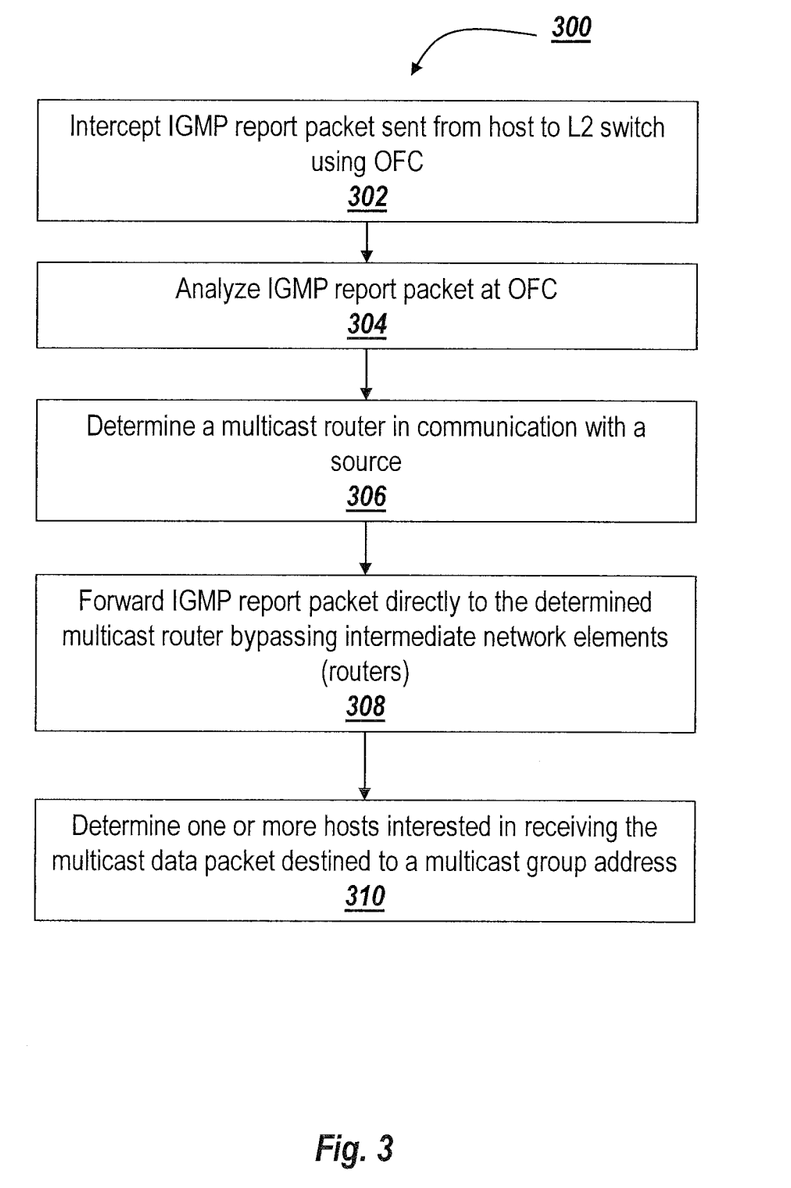
FIG. 3 is a flowchart of actions that may be performed by an OpenFlow controller in a layer-2 multicast transmission according to exemplary embodiments described herein.

FIG. 3 is a flowchart of actions 300 that may be performed by the OpenFlow controller in a layer-2 multicast transmission. The OpenFlow controller may intercept an IGMP report packet sent from one or more hosts to the layer-2 switch in the network (step 302). The IGMP report packet is used by the hosts to express interest in a multicast data packet destined to a multicast group address. The OpenFlow controller may analyze the intercepted IGMP report packet to determine the hosts interested in receiving the multicast data packet (step 304). The OpenFlow controller may determine a multicast router in communication with the source (step 306). The OpenFlow controller may forward the IGMP report packet directly to the multicast router, by-passing intermediate network devices, such as access routers, intermediate routers, etc. (step 308). Accordingly, the intermediate network devices do not have to be multicast enabled. The OpenFlow controller determines the one or more hosts that are interested in receiving the multicast data packet destined to the multicast group address based on the analysis of the IGMP report packet (step 310).

Figure 4:
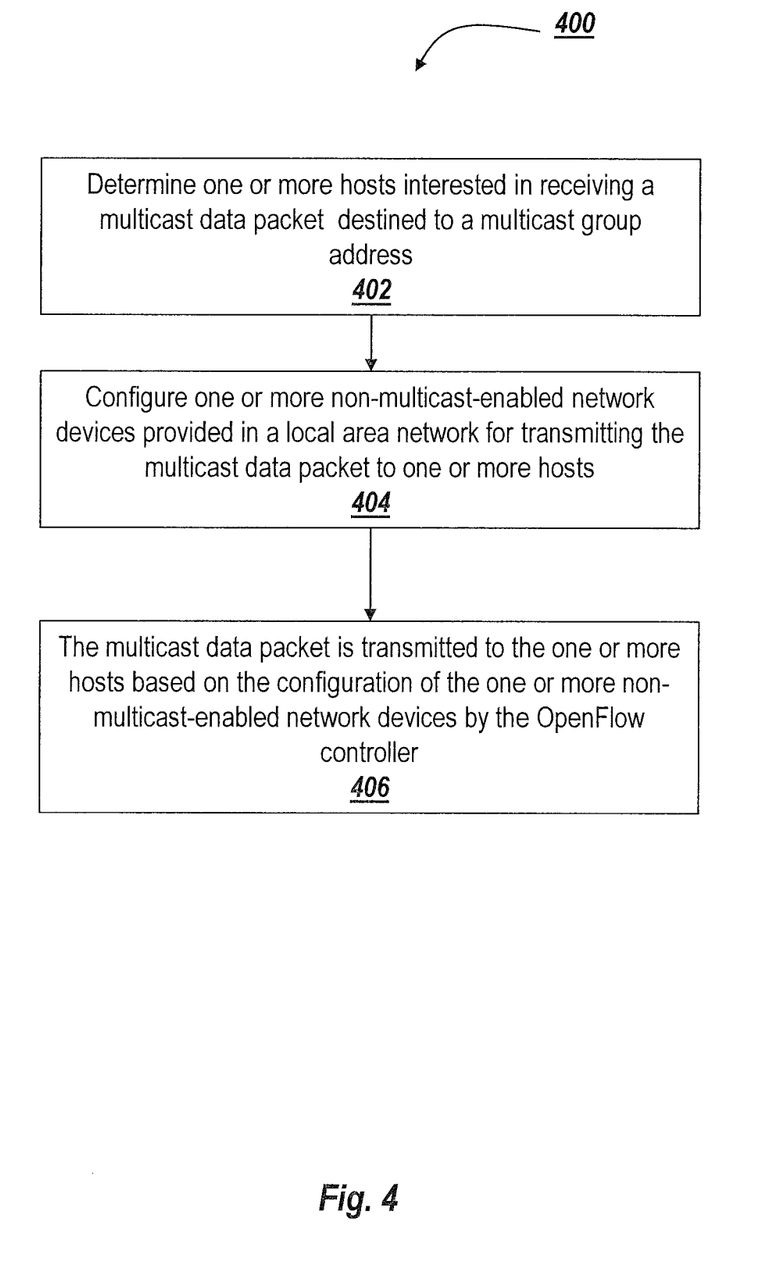
FIG. 4 is a flowchart of actions that may be performed by an OpenFlow controller in a layer-3 multicast transmission according to exemplary embodiments described herein.

FIG. 4 is a flowchart of actions 400 that may be performed by the OpenFlow controller in a layer-3 multicast transmission. As discussed in connection with FIG. 3, the OpenFlow controller determines the one or more hosts interested in receiving a multicast data packet destined to a multicast group address (step 402). Upon determining the hosts, the OpenFlow controller may configure one or more network devices, such as installing flows at the ports of the switches and/or routers, based on the determined hosts. The configuration may include configuring one or more non-multicast-enabled network devices provided in a local area network for transmitting the multicast data packet received from the source to one or more hosts (step 404). The multicast data packet may be transmitted to the determined one or more hosts on the configured network based on the configuration of the one or more non-multicast-enabled network devices by the OpenFlow controller (step 406).

Figure 5:
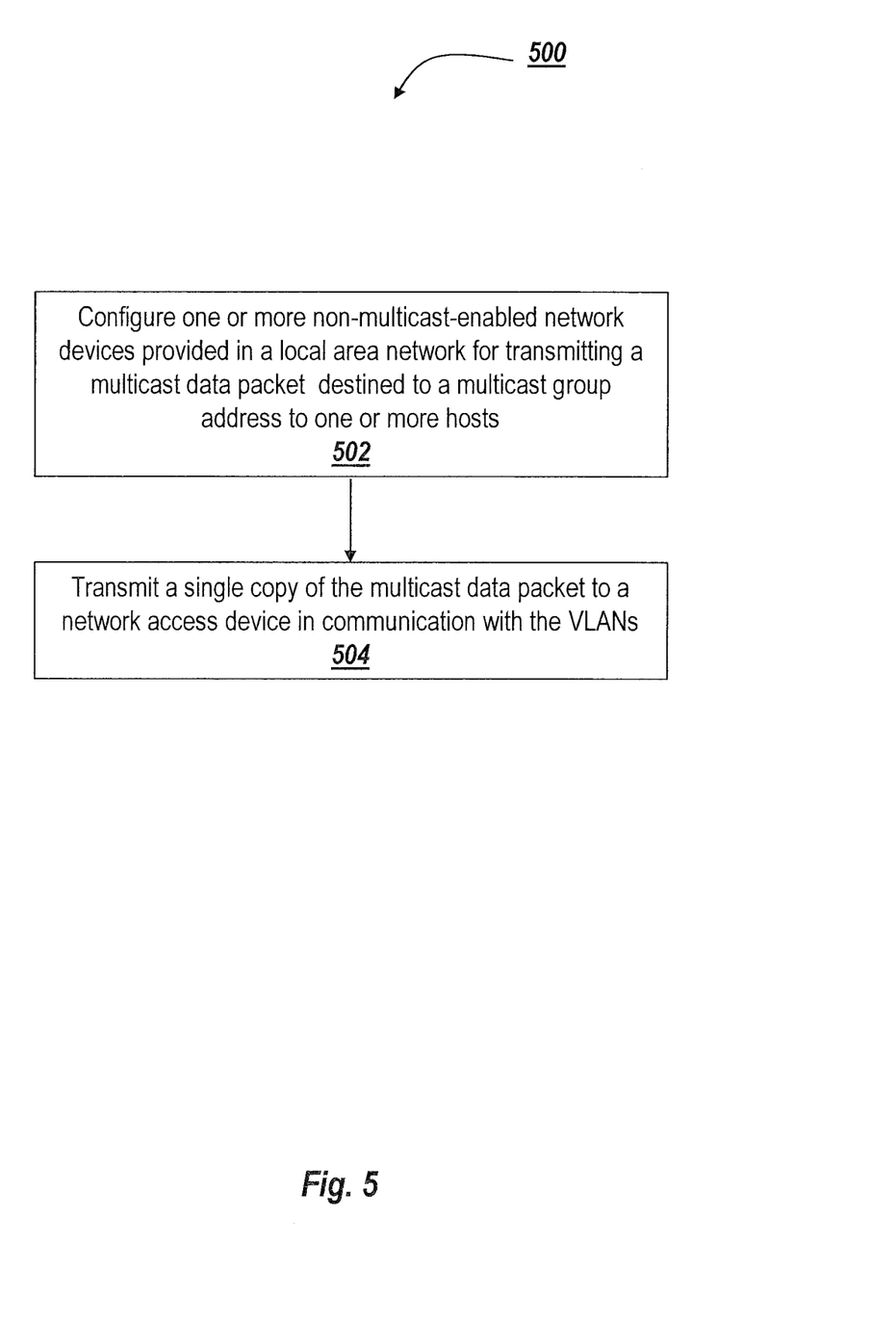
FIG. 5 is a flowchart of actions that may be performed by an OpenFlow controller associated with a network where multiple hosts reside in different virtual local area networks (VLAN) according to exemplary embodiments described herein.

FIG. 5 is a flowchart of actions 500 that may be performed by the OpenFlow controller associated with a network where multiple hosts reside in different VLANs. As discussed in connection with FIG. 4, the OpenFlow controller may configure one or more non-multicast-enabled network devices, such as access routers and intermediate router as well as one or more switches, provided in a local area network for transmitting a multicast data packet destined to a multicast group address to one or more hosts (step 502). If the determined hosts are provided in two or more different VLANs, the OpenFlow controller may optimize the number of multicast data packets that travel through the network. The OpenFlow controller may transmit a single copy of the multicast data packet to a network access device, such as a layer-2 switch, that is in communication with the one or more VLANs (step 504). The replication of the multicast data packet is performed within each VLAN depending on the number of interested hosts that reside in the VLAN.

Figure 6:
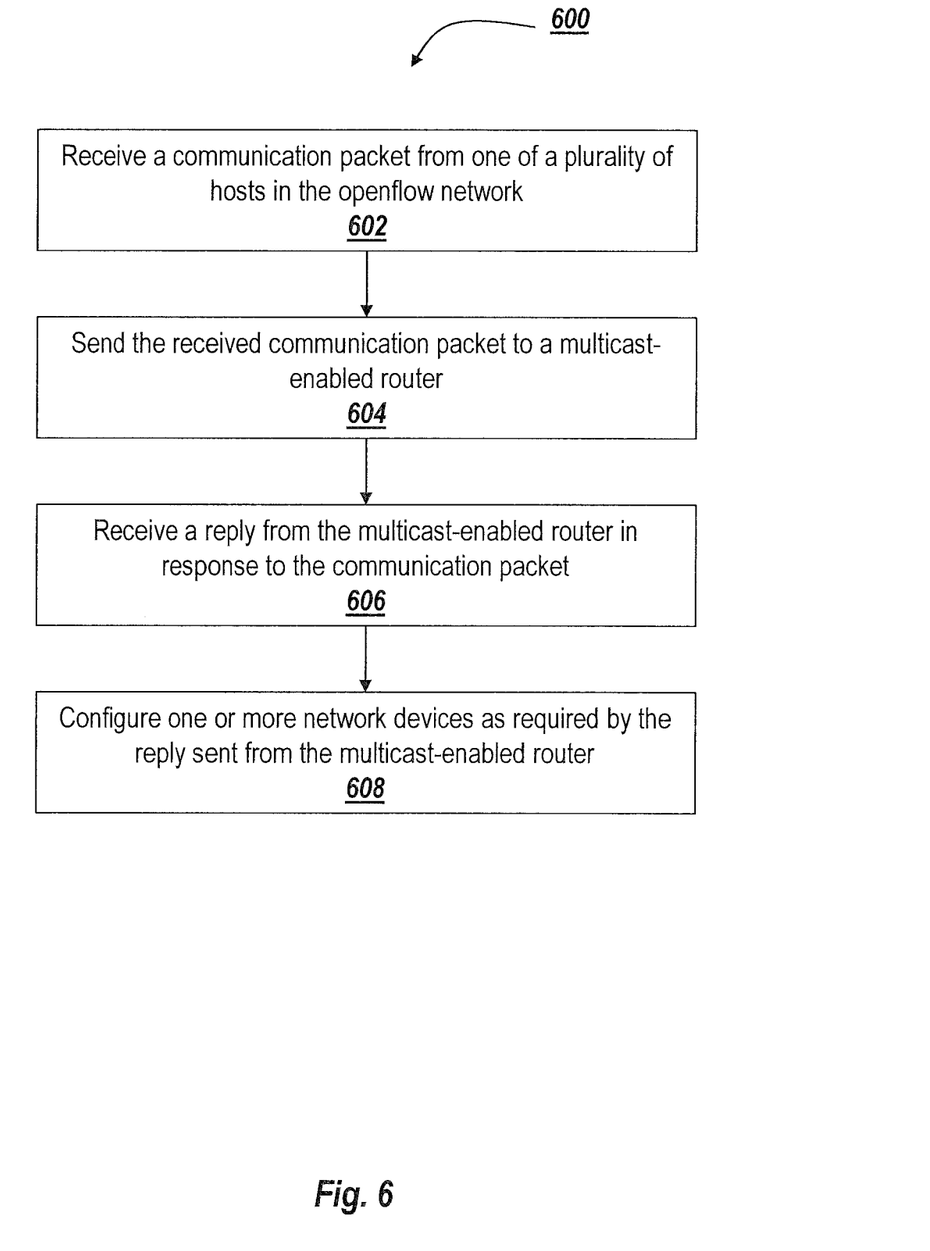
FIG. 6 is a flowchart of actions that may be performed by an OpenFlow controller when there is a communication from within the network associated with the OpenFlow controller according to exemplary embodiments described herein.

FIG. 6 is a flowchart of actions 600 that may be performed by the OpenFlow controller when there is a communication from within the network associated with the OpenFlow controller. When one of the hosts within the OpenFlow network sends a packet to another network device, the OpenFlow controller forward the packet directly to the WAN-edge router. The OpenFlow controller may receive a communication packet from one of the plurality of hosts in the OpenFlow network (step 602). The OpenFlow controller may send the received communication packet directly to a multicast-enabled router (step 604). The OpenFlow controller may receive a reply from the multicast-enabled router in response to the communication packet (step 606). Based on the received reply, the OpenFlow controller may configure one or more network devices as required by the reply sent from the multicast-enabled router (step 608).

Figure 7:
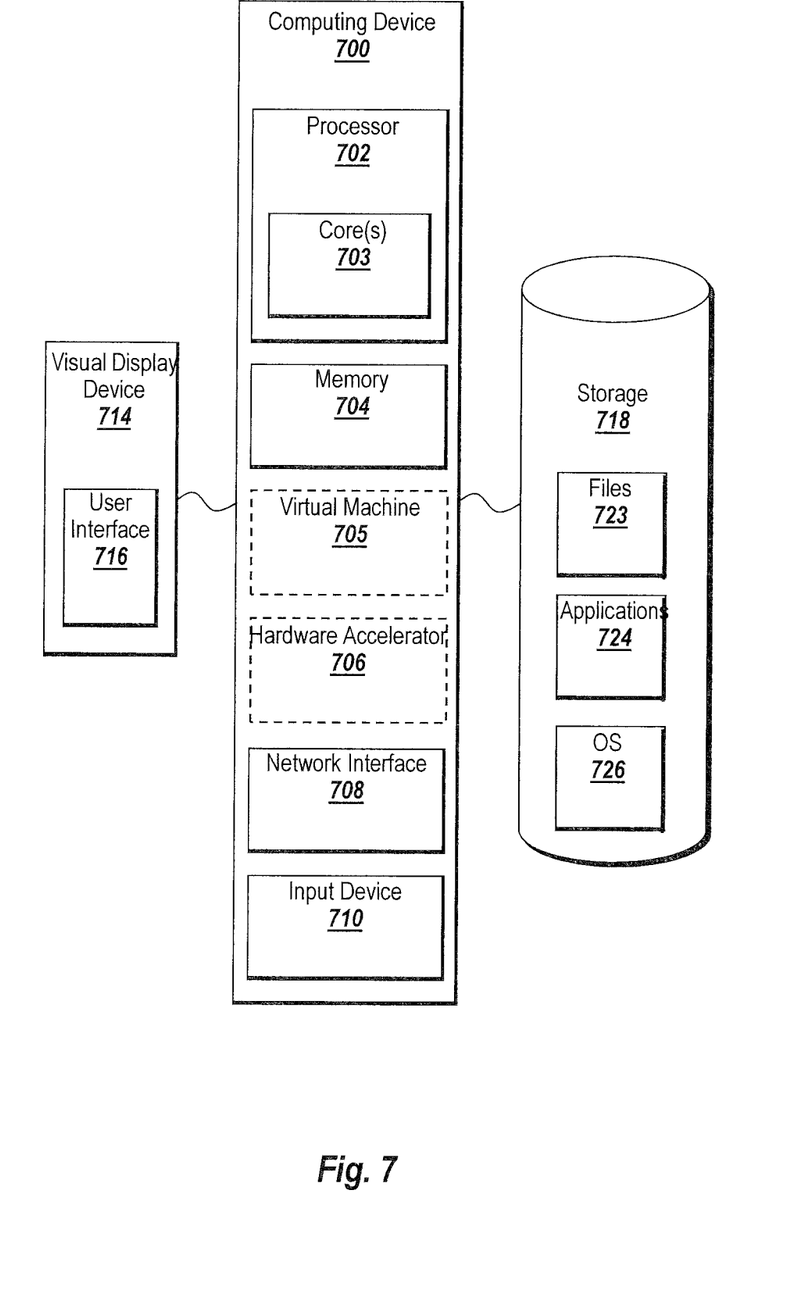
FIG. 7 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 7 depicts an example of an electronic device 700 that may be suitable for use with one or more acts disclosed herein.

The electronic device 700 may take many forms, including but not limited to a computer, workstation, server, network computer, quantum computer, optical computer, Internet appliance, mobile device, a pager, a tablet computer, a smart sensor, application specific processing device, etc.

The electronic device 700 is illustrative and may take other forms. For example, an alternative implementation of the electronic device 700 may have fewer components, more components, or components that are in a configuration that differs from the configuration of FIG. 7. The components of FIG. 7 and/or other figures described herein may be implemented using hardware based logic, software based logic and/or logic that is a combination of hardware and software based logic (e.g., hybrid logic); therefore, components illustrated in FIG. 7 and/or other figures are not limited to a specific type of logic.

The processor 702 may include hardware based logic or a combination of hardware based logic and software to execute instructions on behalf of the electronic device 700. The processor 702 may include logic that may interpret, execute, and/or otherwise process information contained in, for example, the memory 704. The information may include computer-executable instructions and/or data that may implement one or more embodiments of the invention. The processor 702 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 703. Moreover, the processor 702 may include a system-on-chip (SoC) or system-in-package (SiP).

The electronic device 700 may include one or more tangible non-transitory computer-readable storage media for storing one or more computer-executable instructions or software that may implement one or more embodiments of the invention. The non-transitory computer-readable storage media may be, for example, the memory 704 or the storage 718. The memory 704 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 700 may include a virtual machine (VM) 705 for executing the instructions loaded in the memory 704. A virtual machine 705 may be provided to handle a process running on multiple processors so that the process may appear to be using only one computing resource rather than multiple computing resources. Virtualization may be employed in the electronic device 700 so that infrastructure and resources in the electronic device may be shared dynamically. Multiple VMs 705 may be resident on a single computing device 600.

A hardware accelerator 706, may be implemented in an ASIC, FPGA, or some other device. The hardware accelerator 706 may be used to reduce the general processing time of the electronic device 700.

The electronic device 700 may include a network interface 708 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 700 to any type of network capable of communication and performing the operations described herein.

The electronic device 700 may include one or more input devices 710, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 700 may include other suitable I/O peripherals.

The input devices 710 may allow a user to provide input that is registered on a visual display device 714. A graphical user interface (GUI) 616 may be shown on the display device 714.

A storage device 718 may also be associated with the computer 700. The storage device 618 may be accessible to the processor 702 via an I/O bus. The information may be executed, interpreted, manipulated, and/or otherwise processed by the processor 702. The storage device 718 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 718 may further store applications 724, and the electronic device 700 can be running an operating system (OS) 726. Examples of OS 726 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 8:
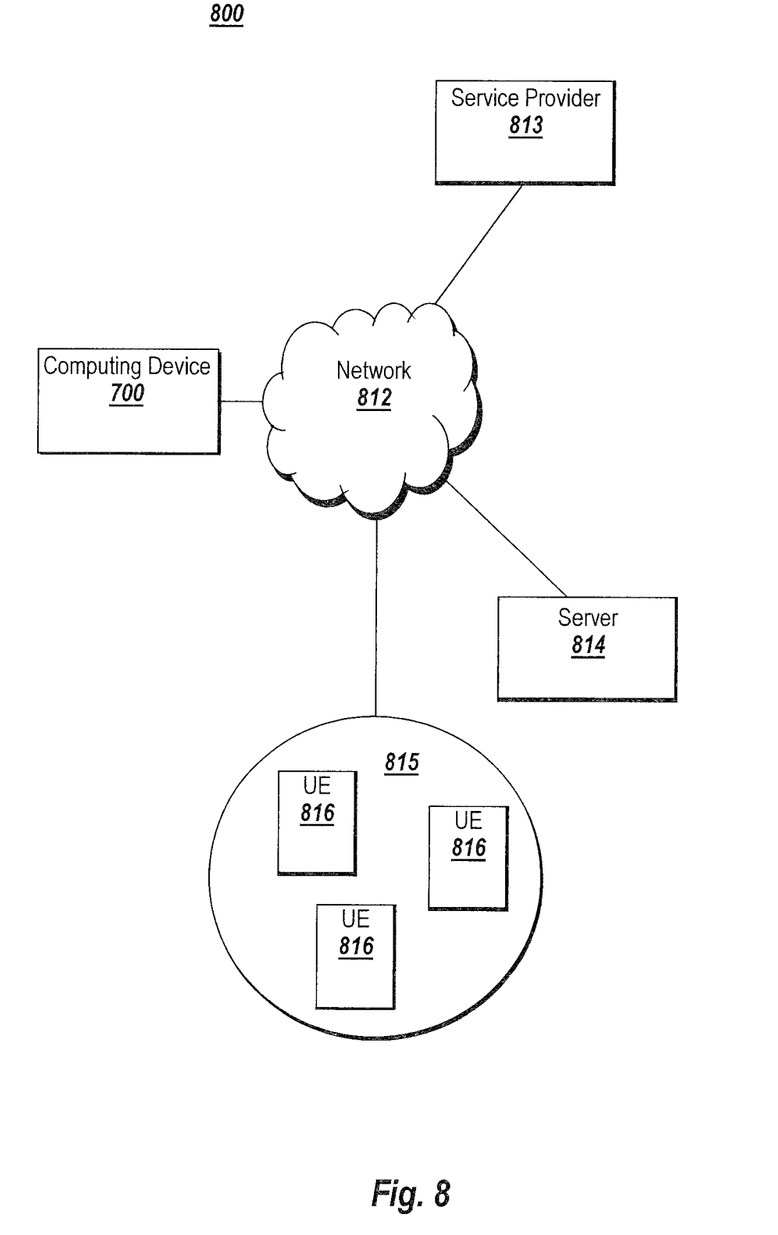
FIG. 8 is a network implementation suitable for use with exemplary embodiments described herein.

FIG. 8 depicts a network implementation that may implement one or more embodiments of the invention. A system 800 may include a computing device 700, a network 812, a service provider 813, a target environment 814, and a cluster 815. The embodiment of FIG. 8 is exemplary, and other embodiments can include more devices, fewer devices, or devices in arrangements that differ from the arrangement of FIG. 8.

The network 812 may transport data from a source to a destination. Embodiments of the network 812 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 700, the service provider 813, etc.). Data may include digital information or analog information. Data may further be packetized and/or non-packetized.

The network 812 may be a hardwired network using wired conductors and/or optical fibers and/or may be a wireless network using free-space optical, radio frequency (RF), and/ or acoustic transmission paths. In one implementation, the network 812 may be a substantially open public network, such as the Internet. In another implementation, the network 812 may be a more restricted network, such as a corporate virtual network. The network 812 may include Internet, intranet, Local Area Network (LAN), Wide Area Network (WAN), Metropolitan Area Network (MAN), wireless network (e.g., using IEEE 802.11), or other type of network The network 812 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 813 may include a device that makes a service available to another device. For example, the service provider 813 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 814 may include a device that receives information over the network 812. For example, the server 814 may be a device that receives user input from the computer 700.

The cluster 815 may include a number of units of execution (UEs) 816 and may perform processing on behalf of the computer 700 and/or another device, such as the service provider 813 or server 814. For example, the cluster 815 may perform parallel processing on an operation received from the computer 700. The cluster 815 may include UEs 816 that reside on a single device or chip or that reside on a number of devices or chips.

The units of execution (UEs) 816 may include processing devices that perform operations on behalf of a device, such as a requesting device. A UE may be a microprocessor, field programmable gate array (FPGA), and/or another type of processing device. UE 816 may include code, such as code for an operating environment. For example, a UE may run a portion of an operating environment that pertains to parallel processing activities. The service provider 813 may operate the cluster 815 and may provide interactive optimization capabilities to the computer 700 on a subscription basis (e.g., via a web service).

Units of Execution (UEs) may provide remote/distributed processing capabilities for the applications 724. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software. No element, act, or instruction used in the description of the invention should be construed critical or essential to the invention unless explicitly described as such. For example, the invention may be practiced with a network where intermediate routers and access routers are multicast-enabled.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic device readable storage medium holding instructions that, when executed, cause one or more processors to:
   configure logic to intercept a unit of communication from one or more hosts by automatically sending the unit of communication to a remote controller, wherein an intended destination of the unit of communication is a network access device;
   intercept the unit of communication sent from the one or more hosts to the network access device with the control logic by automatically sending the unit of communication to the remote controller before the unit of communication reaches the network access device, wherein the unit of communication expresses interest in a multicast data packet destined for a multicast group address;
   analyze the unit of communication to determine the one or more hosts interested in receiving the multicast data packet;
   determine the one or more hosts interested in receiving the multicast data packet;
   identify a multicast-enabled router in communication with a source; and
   send the unit of communication from the remote controller to the multicast-enabled router, wherein the sending bypasses one or more network devices including one or more of a switch, an access router and an intermediary router that are provided between the multicast-router and the determined one or more hosts.

2. The medium of claim 1, wherein the unit of communication is an internet group management protocol (IGMP) report packet.

3. The medium of claim 1, wherein the network access device is a layer-2 switch.

4. The medium of claim 1, wherein the one or more hosts interested in receiving the multicast data packet form at least a portion of a multicast group having the multicast group address.

5. The medium of claim 4, wherein the instructions to identify the multicast-enabled router further comprises instructions to: listen for one or more query messages sent by the multicast-enabled router, wherein the one or more query messages enable the one or more hosts to subscribe to the multicast group.

6. The medium of claim 1, wherein the multicast-enabled router is the only multicast-enabled network device in the network.

7. A non-transitory electronic device readable storage medium holding instructions that, when executed, cause one or more processors to:
   insert a punt flow in a network where one or more hosts are connected, wherein:
      the punt flow automatically sends a unit of communication sent from the one or more hosts to a remote controller, an intended destination of the unit of communication is a network access device, and
      the unit of communication expresses interest in a multicast data packet destined for a multicast group address;
   intercept, by the remote controller and using the punt flow, the unit of communication sent from the one or more hosts to the network access device before the unit of communication reaches the network access device;
   analyze the unit of communication to determine the one or more hosts interested in receiving the multicast data packet;
   determine the one or more hosts interested in receiving the multicast data packet;
   identify a multicast-enabled router in communication with a source; and
   send the unit of communication from the remote controller to the multicast-enabled router, wherein the sending bypasses one or more network devices including one or more of a switch, an access router and an intermediary router that are provided between the multicast-router and the determined one or more hosts.

* * * * *